Patented June 8, 1954

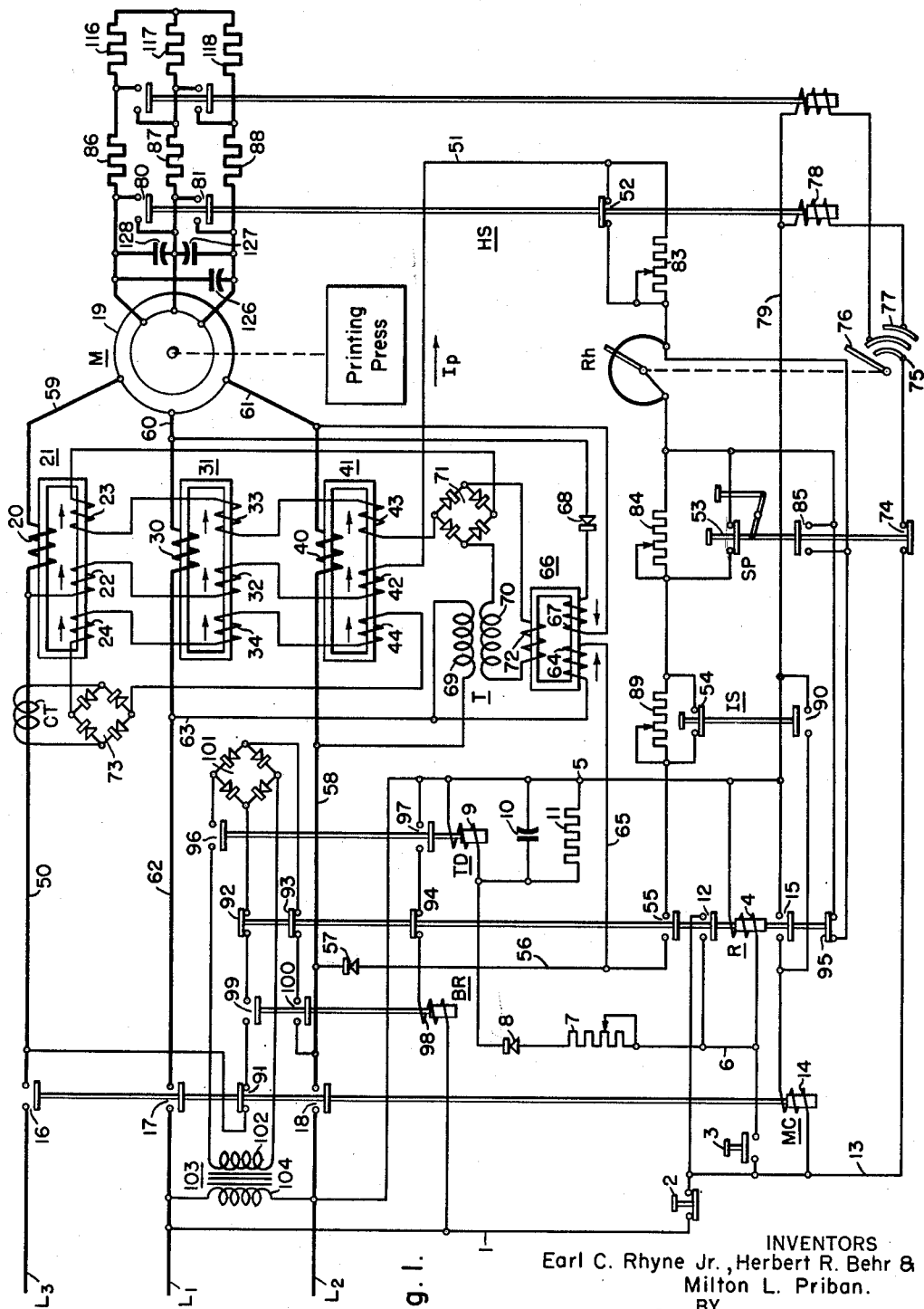
Fig. I.
INVENTORS
Earl C. Rhyne Jr., Herbert R. Behr &
Milton L. Priban.
BY
Paul C. Friedemann
ATTORNEY June 8, 1954  E. C. RHYNE, JR., ET AL  2,680,829
SPEED CONTROL OF INDUCTION MOTORS
Filed Oct. 6, 1951  2 Sheets-Sheet 2
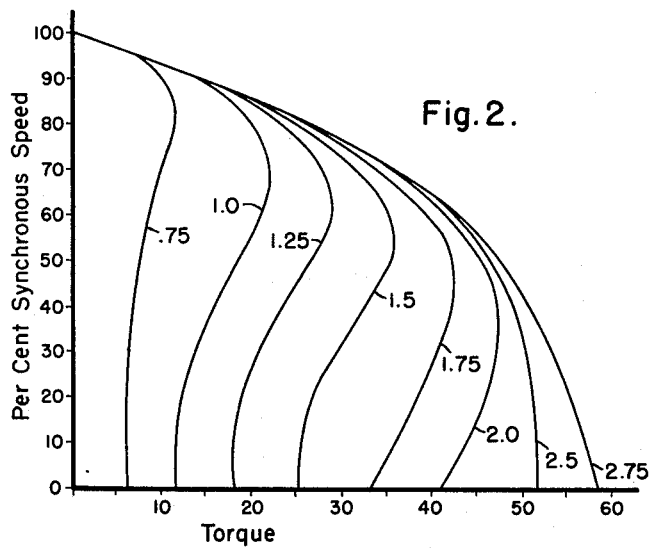
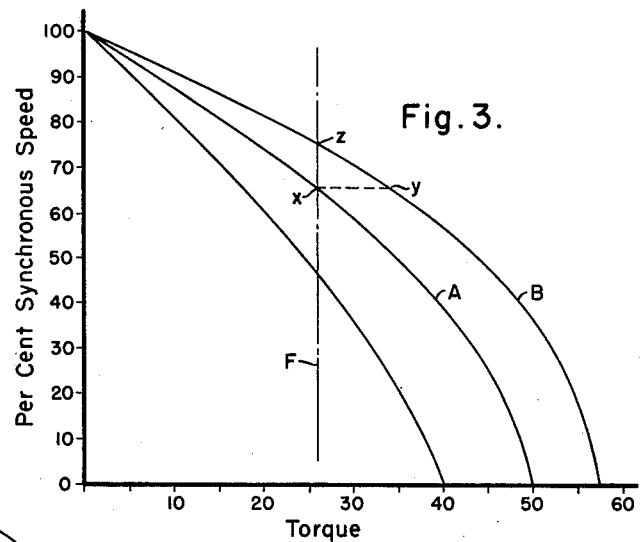
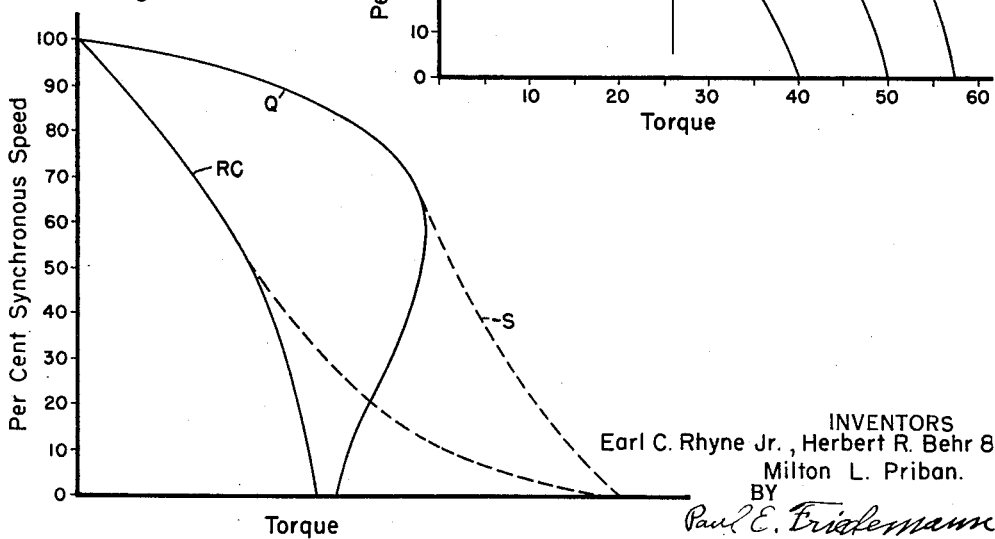
INVENTORS
Earl C. Rhyne Jr., Herbert R. Behr &
Milton L. Priban.
BY
Paul E. Friesemann
ATTORNEY

2,680,829

UNITED STATES PATENT OFFICE 2,680,829

SPEED CONTROL OF INDUCTION MOTORS

Earl C. Rhyne, Jr., Cheektowaga, N. Y., and Herbert R. Behr, Chicago, and Milton L. Priban, Clarendon Hills, Ill., assignors, by direct and mesne assignments, to Cline Electric Manufacturing Company, Chicago, Ill., a corporation of Illinois Application October 6, 1951, Serial No. 250,112

13 Claims. (Cl. 318—201)

Our invention relates to an electric system of control for controlling electric motors, and more particularly our invention relates to a system applicable to control an electric motor of the induction type and the load coupled thereto.

Further, to state to what our invention relates very briefly but yet fairly comprehensively, our invention includes a generic control system utilizing saturable core reactors between the supply of alternating current and an electric load but wherein the load comprises a particular type of motor, an induction motor and its mechanical load, to obtain proper motor acceleration, normal selected constant speed running, selected slow speed running, inching operation of the motor from a condition of rest, and stopping of the motor by means of direct current braking.

The generic control above mentioned is, per se, not part of this invention, but such generic controls are disclosed and claimed in the copending applications of Earl C. Rhyne, Jr., Serial No. 189,220, filed October 9, 1950, and entitled Control Systems for Alternating Current Motors, and Serial No. 250,114, filed on the same date as this application and entitled Control Systems for Alternating Current Motors.

One broad object of our invention is the combining of a generic saturable reactor control with the induction motor to be controlled to provide a complete and commercial product.

Control systems utilizing saturable reactance devices between the alternating current supply and the primary of the motor are well known, but if the pre-saturation of such devices is normally constant, the control performance is not suitable because the speed-torque characteristic of the motor is so modified that a relatively high speed pull-out point exists.

We utilize a saturable core reactor type of control having special feedback features and thus avoid a high speed pull-out. One special feature of our control, by way of illustration, is the provision of automatic recalibration of the control system with changes of impedance of the motor secondary circuit.

It is another broad object of our invention to provide any selected constant speed operation of an induction motor, and thus its load, by merely selecting the desired speed setting on a control circuit of the saturable core reactors utilized, with other suitably energized control circuits providing the necessary stabilizing components to regulate for constant speed.

Another object of our invention is to improve the sensitivity and efficiency of the regulating performance of such control systems so that the controlled series impedances vary more sensitively and over a greater range in response to a change in motor speed, to provide a control that is applicable to a greater variety of loads and in particular a printing press load, and to provide such improved accuracy and efficiency with fewer and smaller components as compared with somewhat similar known systems of control.

The objects recited are merely illustrative. Still other objects and advantages will become more apparent from a study of the following more detailed description of our invention and from a study of the accompanying drawings, in which:

Figure 1 is a diagrammatic showing of our system of control as applied and combined with a single motor driving a printing press;

Figs. 2, 3 and 4 are coordinate speed-torque curves explanatory of the operation of our control system.

In Figure 1, the motor to be controlled is designated by M, the main alternating current energizing terminals are shown as leads $L_1$, $L_2$, and $L_3$ and 21, 31, and 41 designate the saturable core reactors disposed between the leads $L_1$, $L_2$, and $L_3$ and the primary 19 of the motor M.

The motor to be controlled is a wound rotor induction motor having the resistor sections 86, 87, 88, 116, 117 and 118 in the external portion of the secondary winding, or rotor portion, of the motor. The external secondary circuit also includes the capacitors 126, 127, and 128. The purpose of the capacitors will be explained hereinbelow.

The saturable reactors 21, 31 and 41, include the main alternating current windings 20, 30 and 40, respectively, series connected with the primary winding 19, and include the reactor-saturating control windings 22, 23 and 24 and 32, 33 and 34, and 42, 43 and 44, respectively. The windings 22, 32 and 42 are the pattern windings and to provide effective selected constant speed for the motor include in their circuit the speed control rheostat Rh.

The windings 23, 33 and 43 provide a reactor saturating component that is a function of both the armature, or primary, terminal voltage and the supply voltage, and windings 24, 34 and 44 provide a reactor-saturating component that is a function of the armature, or primary current.

The transformer 103 and the rectifier 101 coupled thereto provide direct current braking of the motor M at stopping; the switch SP provides slow speed or trip slow operation of the motor from an operating or running speed condition of the motor, and inching switch IS provides very slow inching speed for the motor from a condition of rest of the motor.

To understand the purpose and advantages of the capacitors 126, 127 and 128 a brief explanation of the curves shown in Figs. 2, 3 and 4 may be helpful.

As mentioned, when an attempt is made at controlling the speed of an induction motor by series impedances in the primary motor circuit with a fixed impedance adjustment, the obtainable stable speed control range is rather limited. This will be understood from the family of speed-torque curves shown in the diagram of Fig. 2. This diagram corresponds to test results taken with a test system similar to the one shown in Fig. 1, but using only pattern windings such as 22, 32 and 42 with adjusting means for such windings. Capacitors such as 126, 127 and 128 were not used. The impedances of the reactor main windings of the test system were controlled only by a selected fixed adjustment of a constant direct-current bias applied by windings such as 22, 32 and 42. The curves shown in Fig. 2 are denoted by values of 0.75, 1.0, 1.25, etc., which quantities represent the fixed amounts of direct-current bias applied to the windings 22, 32 and 42. It will be observed that except for a limited range of high bias currents, the speed-torque curves have a negative slope and hence indicate motor characteristics which are unsuitable for speed control.

In Fig. 3 the speed-torque curves shown in full lines depict motor characteristics obtained by applying selected constant values of voltage to the motor terminals. It will be seen that these curves have positive slopes indicating that speed control of a motor having such characteristics is feasible. For instance, if the motor thus controlled is to operate at a constant load torque denoted by line F, the speed of the motor is definitely determined by the intersection (point X) of the load torque line F with the one selected speed-torque characteristic. Consequently, in a system according to Fig. 1, which regulates the series impedance to maintain a selected motor terminal voltage constant, the just-mentioned conditions permit the selection of definite speed values simply by adjusting the control rheostat Rh in accordance with one of the available speed-torque characteristics.

As far as explained, the performance of the system is independent of the capacitive shunts in the secondary circuit of the motor, and indeed is sufficient for many applications. However, the provision of the capacitive shunt circuits permits further improvements, as will be explained by means of Fig. 4. The speed-torque curve Q in Fig. 4 typifies the performance of an induction motor with relatively low resistance in the rotor circuit. As mentioned, due to the negative slope of this characteristic, a given voltage does not give a definite speed for a given torque below the pull-out speed (about 40% speed in the illustrated example). Consequently, the speed cannot be sufficiently controlled by primary voltage regulation except over a narrow range of speeds close to synchronism.

The characteristic, as regards speed stability, can be improved by increasing the resistance in the rotor circuit, thus obtaining for instance the characteristic represented by curve RC. Such a characteristic can be controlled by primary voltage regulation theoretically down to zero speed, but for a given load torque, as represented by the line F of Fig. 3, the maximum speed obtainable becomes rather limited (60% to 70% of synchronous speed in the illustrated example).

It will, therefore, be understood that in order to obtain a wide range of speed control, a combination utilizing both a primary voltage control and a coordinated change in secondary impedance might be desirable. Indeed it will be obvious that in systems according to the invention, a change in secondary resistance can readily be coordinated with a change in adjustment of the control rheostat, for instance, by means of a master controller jointly controlling the primary and secondary motor circuits. However, when the secondary motor circuit is given a capacitive component, as illustrated in Fig. 1, the available range of speed control can be greatly increased without necessitating a change of the secondary circuit connections. The above-mentioned characteristic Q obtained with a comparatively low resistance in the secondary rotor circuit is modified by the capacitive shunt circuits so as to assume the shape of the characteristic S. This modified characteristic extends the available range of speed control down to near zero speed. The broken-line extensions of the curves shown in Fig. 4 exemplify the modified speed-torque characteristics obtainable by means of parallel capacitors in the secondary motor circuit. The provision of such capacitors has also the advantages of a better power factor, and a higher efficiency at low speeds.

In order to secure the above-explained increase in range of speed control, the shunt capacitors in the secondary motor circuit must be given a sufficiently high capacitance rating. The most favorable rating depends upon the impedance and circuit conditions of the particular application.

A still better understanding of our invention may be had from a study of its operation. Let the assumption be that lines $L_1$, $L_2$, and $L_3$ are coupled to a suitable constant voltage constant frequency supply of alternating current, that the wound rotor induction motor M is coupled to its load, for example, a printing press, and that the attendant wishes to start and operate the motor subject to the control provided. The start switch 3 is operated whereupon a circuit is established from lead $L_1$ through conductor 1, stop switch 2, start switch 3, actuating coil 4 of the control relay R, the conductor 5 to the lead $L_2$.

A second circuit is established from conductor 1, through stop switch 2, start switch 3, conductor 6, adjustable resistor 7, rectifier 8, actuating coil 9 of the time delay relay TD to conductor 5 and line $L_2$. A capacitor 10 of a selected capacity is connected in parallel to the actuating coil 9 of time delay relay TD and a leakage resistor 11 of a relatively high resistance value is connected in parallel to both the coil 9 and the capacitor 10. The capacity of the capacitor 10 is so selected that the time delay relay TD has both a time delay of a selected value on pick-up and a time delay on drop-out.

The energization of coil 4 causes the operation of the control relay R to close the contacts 12, 15 and 55, and the opening of contacts 92, 93, 94 and 95. The closing of contacts 12 establishes a holding circuit for coil 4, and the closing of contacts 15 establishes a circuit across conductors 1 and 5 including stop switch 2, conductor 13, actuating coil 14 of the main contactor MC, and contacts 15 of relay R.

Operation of the main contactor MC closes contacts 16, 17 and 18 connecting the motor primary winding 19 to the supply of alternating current through the main, or alternating current windings 20, 30 and 40 of the saturable core reactors 21, 31 and 41. The motor thus operates its load.

The voltage applied to the motor at the instant of the closing of the contacts 16, 17 and 18 is rather low because the reactors, being unsaturated, have a relatively high reactance. The starting torque is, of course, also influenced by the value of the effective impedance of the motor secondary winding. To obtain the maximum starting torque the contacts 80 and 81 are in open position initially so that all of the resistor sections 86, 87, 88, 116, 117 and 118 are in the secondary circuit.

The instant after both the control relay R and the main contactor MC have operated, a circuit is established from the energized conductor 50, through the reactor saturating windings 22, 32 and 42, conductor 51, contacts 52 on the high speed contactor HS, a portion of the rheostat Rh, contacts 53, of the slow speed switch SP, contacts 54 of the inch switch IS, contacts 55 of the control relay R, conductor 56, and rectifier 57 to the energized conductor 58. A reactor-saturating current $I_D$ is thus caused to flow in the windings 22, 32 and 42. The degree of saturation of the reactors 21, 31 and 41 is determined by the position of the arm on the rheostat Rh. When the contacts MC first close, there is no D.-C. saturation current in the reactors and (except for the transient) only a low voltage is applied to the motor terminals since the voltage drop across the series reactors is large. Thereafter the current $I_D$ builds up as determined by rheostat Rh to decrease the circuit reactance and increase the voltage applied to the motor terminals.

With the energization of conductors 62 and 58 another circuit is established including conductor 63, winding 64 of a control, or signal mixing reactor 66, conductor 65, conductor 56, and rectifier 57. The winding 64 is thus supplied with a current that is a function of the supply voltage. The signal mixing reactor 66 has a second direct current winding 67 that is energized, through rectifier 68, from the motor primary terminals 60 and 61, as shown. The direct currents in the windings 64 and 67 are so applied to these windings that their magnetic fluxes are in opposition in the core, as shown by the arrows adjacent these windings 64 and 67.

The alternating current energization of the signal mixing reactor 66 is effected by the transformer T. This transformer has its primary winding 69 connected to the energized conductors 58 and 63 and the secondary winding 70 is connected in a closed circuit including the A.-C. terminals of rectifier 71 and the alternating current winding 72 of the reactor 66. From the circuits just traced, it is apparent that the direct current output of the rectifier 71 is a function of both, the supply voltage and the primary terminal voltage. The output of the rectifier 71 is connected, as shown, in a loop circuit including the saturable core reactor windings 23, 33 and 43. The windings 23, 33 and 43 are poled to aid the windings 22, 32 and 42.

To provide the reactors 21, 31 and 41 with a saturating component that is a function of the armature current, we connect the current transformer CT across the rectifier 73 and connect the output circuit of the rectifier 73 in a loop circuit with the reactor control windings 24, 34 and 44. The windings 24, 34 and 44 are poled to aid the main or pattern windings 22, 32 and 42. The poling is indicated by the arrows adjacent the windings.

When the motor M is to be operated at high speed, the arm of rheostat Rh is moved clockwise to a greater extent than shown so that the arm 76 bridges the segments 75 and 77 to thus establish a circuit from the energized conductor 13, through contacts 74 of the slow speed switch SP, segment 75, arm 76, segment 77, actuating coil 78 of the high speed contactor HS and conductor 79 to the energized conductor 5.

Operation of the high speed contactor HS causes the closing of contacts 80 and 81 and the opening of contacts 52. The opening of contacts 52 causes the insertion of the adjustable resistor 83 in the circuit of the pattern windings 22, 32 and 42. This adjustable resistor 83 recalibrates the rheostat Rh for the changed secondary resistance effected by the closing of contacts 80 and 81, the aim usually being by such recalibration to avoid abrupt speed changes as the high speed contactor operates and to obtain the higher and higher speeds by further clockwise movement of the rheostat Rh.

It will be more apparent how abrupt speed changes are avoided by reference to the curves shown in Fig. 3. If the motor were operating at point $x$ on the speed torque curve A just prior to operation of the high speed contactor HS, and right after operation of the high speed contactor HS, is shifted to the curve B tending to drive load F at speed Z. Then, if abrupt speed changes are to be avoided, the insertion of the resistor 83 in the circuit of the pattern windings 22, 32 and 42 of the reactors 21, 31 and 41 effects a transfer from point $y$ on curve B back to point $x$ on curve A (which curve A now represents a different voltage). Of course, the speed at the change-over point can be set by merely adjusting the resistance value of resistor 83 to vary the series reactance in the primary circuit of the motor, and preferably should be such that the speed immediately after the contactor 52 operates is exactly the same as the speed immediately before the contactor operates.

If slow motor speed is to be effected with the motor in operation, then the slow speed switch SP is operated to open the contacts 53 to insert the slow speed adjustable resistor 84 in the circuit of the pattern windings, and contacts 85 are closed to completely shunt out the rheostat Rh. The contacts 74 are opened to effect insertion of the resistor sections 86, 87, 88, 116, 117 and 118 in the motor secondary circuit, to in part effect slow speed operation by secondary resistance control. The resistance value of the adjustable resistor 84 is selected to effect the appropriate slow speed operation.

If, with the motor at rest, the motor M is to be operated at inching speed, then the inching switch IS is operated to open the contacts 54 to insert the inching resistor 89 in the circuit of the pattern windings. The inching switch also operates contacts 90. The closure of these contacts 90 effects energization of the main contactor MC independently of the start switch push button 3. Inching, except for very rare applications, is always started from a stopped condition of the motor. The particular control herein disclosed applies particularly to a single motor printing press. In such application of our control it is very important that it shall not be possible to effect normal motor running operation by means of the inching switch. Since start switch 3 is open and the motor is started from rest, neither the control relay R nor the time delay relay TD can be energized, but the main contactor MC is energized as long, and only as long, as contacts 90 are closed.

If the motor is to be stopped from normal operation, the stop switch 2 is actuated which effects the opening of the energizing circuits for coil 4 of the control relay R, coil 14 of the main contactor MC, and the coil 9 of the time delay relay TD. Since neither the relay R nor the main contactor MC have any appreciable time constant, the contacts 16, 17 and 18, on the main contactor and contacts 15, 12 and 55 on the relay R are open almost instantly, and the contacts 91 on the main contactor, and contacts 92, 93, 94 and 95 on the control relay R close almost instantly, but the contacts 96 and 97 on the time delay relay TD remain closed for a selected time interval. The time constant on dropout of the relay TD is matched to fit the braking period required to stop the motor and its load.

The closing of contacts 94 establishes a circuit from the energized conductor 1 through the actuating coil 98 of the braking relay BR, including contacts 97 of the time delay relay TD, to the conductor 5. The braking relay BR now closes its contacts 99 and 100. A braking circuit is thus established from the positive terminal of the rectifier 101 through the contacts 92, 99, 91, conductor 50, winding 20, terminal 59, the motor primary winding 19, terminal 61, winding 40, conductor 58, contacts 100 and 93 to the negative terminal of the rectifier 101. The rectifier 101 is energized through contacts 96, from the secondary winding 102 of the transformer 103. The transformer primary 104 is connected directly across the leads L1 and L2 as shown.

Although but one embodiment of this invention has been herein illustrated and described, it will be appreciated by those skilled in the art that various modifications may be made in system details without departing from the spirit and scope of this invention. Accordingly, it is intended that the foregoing disclosure and the illustrations in the drawings shall be considered only as illustrative and not interpreted in a limiting sense.

We claim as our invention:

1. In a system of control for an induction motor, in combination, an induction motor having a primary winding and a secondary winding, said secondary winding including speed control resistors in the secondary circuit, a saturable reactance means having a main alternating current winding series connected with the primary winding and having a plurality of direct-current reactor-saturating control windings, a direct-current source of adjustable constant voltage connected to a first of said reactor-saturating windings, a speed-controlling and speed-setting rheostat connected to adjust the voltage supplied to said first reactor-saturating winding, an adjustable resistor in the circuit of said first reactor-saturating winding and a slow speed normally closed switch shunting the adjustable resistor, whereby operation of the slow speed switch to open position inserts the adjustable resistor in the circuit of the first reactor-saturating winding, normally open contactors for shunting the speed control resistor in the secondary circuit, electromagnetic means for effecting the closing of the contactors for shunting the resistor sections in the secondary circuit, a second of said reactor-saturating windings for providing a control component to the saturable reactors proportional to the load current of the motor, said speed control resistors in the secondary circuit being operable to change the slope of the speed-torque characteristic of the motor.

2. In a system of control for an induction motor, in combination, an induction motor having a primary winding and a secondary winding, said secondary winding including speed control resistors in the secondary circuit, a saturable reactance means having a main alternating current winding series connected with the primary winding and having a plurality of direct-current reactor-saturating control windings, a direct-current source of adjustable constant voltage connected to a first of said reactor-saturating windings, a speed-controlling and speed-setting rheostat connected to adjust the voltage supplied to said first reactor-saturating winding, an adjustable resistor in the circuit of said first reactor-saturating winding and an inching switch normally closed to shunt said adjustable resistor, whereby operation of the inching switch to open position inserts said adjustable resistor in the circuit of said first reactor-saturating winding, normally open contacts for shunting the speed control resistor in the secondary circuit, electromagnetic means for effecting the closing of the contactors for shunting the resistor sections in the secondary circuit, a second of said reactor-saturating windings for providing a control component to the saturable reactors proportional to the load current of the motor, said speed control resistors in the secondary circuit being operable to change the slope of the speed-torque characteristic of the motor.

3. In a system of control for an induction motor, in combination, an induction motor having a primary winding and a secondary winding, said secondary winding including speed control resistors in the secondary circuit, a saturable reactance means having a main alternating current winding series connected with the primary winding and having a plurality of direct-current reactor-saturating control windings, a direct-current source of adjustable constant voltage connected to a first of said reactor-saturating windings, a speed-controlling and speed-setting rheostat connected to adjust the voltage supplied to said first reactor-saturating winding, a first adjustable resistor in the circuit of said first reactor-saturating winding and an inching switch normally closed to shunt said first adjustable resistor, said second adjustable resistor in the circuit of the first reactor-saturating winding, a normally closed contactor shunting at least a part of one of said resistors, normally open contactors for shunting said speed control resistor in the secondary circuit, electromagnetic means for effecting the opening of the first named contactor to recalibrate the effect of the first reactor-saturating winding, said electromagnetic means effecting closing of the second named contactors for shunting the resistor sections in the secondary circuit, a second reactor-saturating winding for providing a control component to the saturable reactors proportional to the load current of the motor, said speed control resistors in the secondary circuit being operable to change the slope of the speed-torque characteristic of the motor.

4. In a system of control for an induction motor, in combination, an induction motor having a primary winding and a secondary winding, said secondary winding including speed control resistors in the secondary circuit, a saturable reactance means having a main alternating current winding series connected with the primary winding and having a plurality of direct-current reactor-saturating control windings, a direct-current source of adjustable constant voltage connected to a first reactor-saturating winding, a speed-controlling and speed-setting rheostat connected to adjust the voltage supplied to said first reactor-saturating winding, normally open contactors for shunting the speed control resistor in the secondary circuit, electromagnetic means for effecting the closing of said contactors for shunting the resistor sections in the secondary circuit, a second of said reactor-saturating windings for providing a control component to the saturable reactors proportional to the load current of the motor, a third of said reactor-saturating windings for producing a control component that is a function of the primary terminal voltage, said speed control resistors in the secondary circuit being operable to change the slope of the speed-torque characteristic of the motor.

5. In a system of control for an induction motor, in combination, an induction motor having a primary winding and a secondary winding, said secondary winding including speed control resistors in the secondary circuit, a saturable reactance means having a main alternating current winding series connected with the primary winding and having a plurality of direct-current reactor-saturating control windings, a direct-current source of adjustable constant voltage connected to a first reactor-saturating winding, a speed-controlling and speed-setting rheostat connected to adjust the voltage supplied to said first reactor-saturating winding, normally open contactors for shunting said speed control resistors in the secondary circuit, electromagnetic means for effecting the closing of the contactors for shunting the resistor sections in the secondary circuit, a second of said reactor-saturating windings for providing a control component to the saturable reactors proportional to the load current of the motor, a third of said reactor saturating windings for producing a control component that is a function of the primary terminal voltage and a function of the voltage of the alternating-current supply to said main winding, said speed control resistors in the secondary circuit being operable to change the slope of the speed-torque characteristic of the motor.

6. In a system of control for an induction motor, in combination, an induction motor having a primary winding and a secondary winding, said secondary winding including speed control resistors in the secondary circuit and including capacitors in the secondary circuit, a saturable reactance means having a main alternating current winding series connected with the primary winding and having a plurality of direct-current reactor-saturating control windings, a direct-current source of adjustable constant voltage connected to a first of said reactor-saturating windings, a speed-controlling and speed-setting rheostat connected to adjust the voltage supplied to said first reactor-saturating winding, a first adjustable resistor in the circuit of said first reactor-saturating winding and a slow speed normally closed switch shunting at least a portion of said adjustable resistor, whereby operation of the slow speed switch to open position inserts the shunted portion of said adjustable resistor in the circuit of said first reactor-saturating winding, a second adjustable resistor in the circuit of said first reactor-saturating winding and an inching switch normally closed to shunt at least a portion of said second adjustable resistor, whereby operation of the inching switch to open position inserts the shunted portion of said second adjustable resistor in the circuit of said first reactor-saturating winding, a third adjustable resistor in the circuit of said first reactor-saturating winding, a normally closed contactor shunting at least a portion of one of said resistor sections, normally open contactors for shunting the speed control resistor in the secondary circuit, electromagnetic means for effecting the opening of the first named contactor to recalibrate the effect of said first reactor-saturating winding, said electromagnetic means effecting closing of said second named contactors for shunting the resistor sections in the secondary circuit, a second of said reactor-saturating windings for providing a control component to the saturable reactors proportional to the load current of the motor, a third of said reactor-saturating windings for producing a control component that is a function of the primary terminal voltage and a function of the alternating current voltage supplied to said main winding, said speed control resistors in the secondary circuit and the capacitors included in the secondary circuit being operable to change the shape of the speed-torque characteristic of the motor.

7. In a control for a three-phase wound rotor induction motor having a three-phase primary winding and a three-phase secondary winding, the combination of, circuit connections for applying a three-phase alternating current voltage to said primary winding, control means connected with said circuit connections for controlling the supply of electrical energy to said motor, variable impedance means connected with said control means for controlling said control means, impedance means connected in said three-phase secondary winding, said impedance means comprising a resistive component and a capacitive component, electro-magnetically operated switching means for shunting at least a portion of said resistive component upon operation thereof, switch means mechanically controlled by adjustment of said variable impedance means for operating said electro-magnetically operated switching means, recalibrating impedance means connected in series with said variable impedance means, and control means on said electro-magnetically operated switching means normally shunting at least a portion of said recalibrating impedance means.

8. In a control for a three-phase wound rotor induction motor having a three-phase primary winding and a three-phase secondary winding, the combination of, circuit connections for applying a three-phase alternating-current voltage to said primary winding, control means connected with said circuit connections for controlling the supply of alternating current voltage to said primary winding, resistance means connected with said three-phase secondary winding, adjustable impedance means connected with said control means for controlling the impedance of the latter, switching means normally shunting at least a part of said adjustable impedance means, said switching means being operable to shunt at least part of said resistance means and to open the shunt around said part of said adjustable impedance means, and means operated by adjustment of said adjustable impedance means for operating said switching means.

9. In a control for a three-phase wound rotor induction motor having a three-phase primary winding and a three-phase secondary winding, secondary circuit impedance means connected in circuit with said secondary winding, variable impedance means connected in circuit with said primary winding for controlling a supply of alternating current thereto, adjustable control means for controlling the impedance of said variable impedance means, and switching means responsive to adjustment of said control means and having contact means for simultaneously decreasing the impedance of said secondary circuit impedance means and recalibrating said adjustable control means.

10. In a control for inching operation of an induction motor, the combination of, reactor means adapted for connection in series with said motor, control winding means for said reactor means, impedance control means connected in series with said control winding means to control energization of said control winding means, an inching switch normally shunting at least a portion of said impedance control means, a main switch for establishing an energizing connection for said reactor means and said motor, and electrical means controlled by said inching switch for closing said main switch upon operation of said inching switch.

11. In a control for an induction motor having a primary circuit and a secondary circuit, the combination of, impedance means in said secondary circuit, reactor means connected in said primary circuit for controlling the excitation thereof, control winding means for said reactor means, a rheostat for controlling the excitation of said control winding means, resistance means connected in series with said rheostat, a relay having normally open contacts operable when the relay is energized to shunt at least a portion of said impedance means in said secondary circuit, a switch controlled by said rheostat to energize said relay upon movement of said rheostat in a direction to increase the speed of said motor, and slow speed switch means having contact means normally shunting at least a part of said resistance, for simultaneously, upon operation thereof, deenergizing said relay, shunting said rheostat and inserting said resistance in the circuit of said control winding means.

12. In a control for an induction motor, means for controlling the terminal voltage of said motor comprising, reactance means, reactance control winding means for controlling the reactance of the reactance means, a transformer having a primary winding connected to the input side of said reactance means and having a secondary winding, a reactor having a main winding and a pair of control windings, full-wave rectifier means, circuit means connecting said secondary winding in series with said main winding across the input of said full-wave rectifying means, said reactance control winding means being connected across the output of said full-wave rectifying means, rectifier means connecting one of said pair of control windings to the input of said reactor means, and rectifier means connecting the other of said pair of control windings to the output of said reactor means.

13. In a control for an induction motor, means for controlling the terminal voltage of said motor comprising, reactance means, reactance control winding means for controlling the reactance of the reactance means, a transformer having a primary winding connected to the input side of said reactance means and having a secondary winding, a reactor having a main winding and a pair of control windings, full-wave rectifier means, circuit means connecting said secondary winding in series with said main winding across the input of said full-wave rectifying means, said reactance control winding means being connected across the output of said full-wave rectifying means, rectifier means connecting one of said pair of control windings to the input of said reactor means, rectifier means connecting the other of said pair of control windings to the output of said reactor means, and current responsive means having an input connected to the input of said reactance means and an output connected to said reactance control winding means.

References Cited in the file of this patent

UNITED STATES PATENTS

| Number | Name | Date |
| --- | --- | --- |
| 2,386,580 | Wickerham | Oct. 9, 1945 |
| 2,433,153 | Pell et al. | Dec. 23, 1947 |
| 2,519,196 | Pell | Aug. 15, 1950 |